(12) United States Patent
Narumi (10) Patent No.: US 11,572,037 B2
(45) Date of Patent: Feb. 7, 2023

(54) DRIVER ASSISTANCE SYSTEM AND DRIVER ASSISTANCE METHOD

(71) Applicant: KABUSHIKI KAISHA TOKAI RIKA DENKI SEISAKUSHO, Aichi (JP)

(72) Inventor: Kenji Narumi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/296,364

(22) PCT Filed: Nov. 25, 2019

(86) PCT No.: PCT/JP2019/045980
§ 371 (c)(1),
(2) Date: May 24, 2021

(87) PCT Pub. No.: WO2020/110999
PCT Pub. Date: Jun. 4, 2020

(65) Prior Publication Data
US 2022/0024408 A1    Jan. 27, 2022

(30) Foreign Application Priority Data

Nov. 29, 2018 (JP) .............................. JP2018-223276

(51) Int. Cl.
*B60R 25/102*    (2013.01)
*B60R 25/24*    (2013.01)
(Continued)

(52) U.S. Cl.
CPC ............ *B60R 25/102* (2013.01); *B60R 25/24* (2013.01); *G07C 5/008* (2013.01); *G08B 21/06* (2013.01); *B60R 2325/205* (2013.01)

(58) Field of Classification Search
CPC ......... B60R 16/02; B60R 25/01; B60R 25/04; B60R 25/102; B60R 25/2018;
(Continued)

(56) References Cited

U.S. PATENT DOCUMENTS

| | | | |
|---|---|---|---|
| 9,493,149 B2 * | 11/2016 | Phelan | B60W 10/04 |
| 9,754,425 B1 * | 9/2017 | Iqbal | B60W 40/09 |
| 2012/0268267 A1 * | 10/2012 | Anderson | B60R 25/33 340/539.1 |

(Continued)

FOREIGN PATENT DOCUMENTS

| | | |
|---|---|---|
| JP | 2014-044707 A | 3/2014 |
| JP | 2015-052223 A | 3/2015 |

(Continued)

OTHER PUBLICATIONS

International Search Report, including English Language Translation, dated Feb. 10, 2020 by the Japan Patent Office (JPO), in International Patent Application No. PCT/JP2019/045980.

*Primary Examiner* — Stephen R Burgdorf
(74) *Attorney, Agent, or Firm* — Greenblum & Bernstein, P.L.C.

(57) ABSTRACT

A driver assistance system uses a wireless authentication functionality to perform authentication using key information through wireless communication between a portable terminal that obtains the key information required to operate a vehicle through network communication and an authentication device arranged in the vehicle. The authentication device actuates the vehicle through an electronic key system of the vehicle when the authentication is accomplished. A determination unit of the driver assistance system receives operation information based on a vehicle operation performed by a driver who is driving the vehicle, performs an abnormality determination that checks whether the vehicle operation is abnormal from the operation information, and (Continued)

performs a predetermined action when the vehicle operation is determined as being abnormal. The determination unit uses the wireless authentication functionality to execute at least part of a series of processes of the abnormality determination and the predetermined action.

5 Claims, 4 Drawing Sheets

(51) Int. Cl.
*G07C 5/00* (2006.01)
*G08B 21/06* (2006.01)

(58) Field of Classification Search
CPC ..... B60R 25/209; B60R 25/24; B60R 25/241; B60R 25/243; B60R 25/245; B60R 2325/205; B60W 50/14; G06Q 50/30; G07C 5/008; G07C 9/00309; G08B 21/06; G08G 1/20; G16Y 10/40; G16Y 40/50; H04L 63/0838; H04M 1/00
USPC ......................................................... 340/576
See application file for complete search history.

(56) References Cited

U.S. PATENT DOCUMENTS

| | | | |
|---|---|---|---|
| 2012/0313796 A1* | 12/2012 | Lee | B60Q 1/52 701/2 |
| 2015/0198948 A1* | 7/2015 | Godley | G07C 5/008 701/2 |
| 2016/0071333 A1* | 3/2016 | Haidar | G07C 5/008 701/29.3 |
| 2017/0080856 A1 | 3/2017 | Enomoto et al. | |
| 2017/0134503 A1* | 5/2017 | Cho | H04L 67/12 |
| 2018/0009416 A1* | 1/2018 | Maiwand | G07C 9/00571 |
| 2018/0186334 A1* | 7/2018 | Munafo | G06N 3/08 |
| 2018/0338241 A1* | 11/2018 | Li | G08B 5/222 |
| 2019/0052714 A1* | 2/2019 | Shin | H04W 12/06 |
| 2020/0020188 A1* | 1/2020 | Shin | H04L 67/18 |
| 2021/0171048 A1* | 6/2021 | Jeon | B60W 30/182 |

FOREIGN PATENT DOCUMENTS

| | | |
|---|---|---|
| JP | 2016-153280 A | 8/2016 |
| JP | 2017-059043 A | 3/2017 |
| JP | 2018-028192 A | 2/2018 |

* cited by examiner

DRIVER ASSISTANCE SYSTEM AND DRIVER ASSISTANCE METHOD

TECHNICAL FIELD

The present invention relates to a driver assistance system and a driver assistance method that assist vehicle driving.

BACKGROUND ART

A known driver assistance system monitors the state of a driver who is driving the vehicle and assists the driver in accordance with the state of the driver. Patent Document 1 discloses technology that is used to assist a driver when the alertness of the driver declines. The driver assistance system monitors vehicle operations performed by the driver to detect a decline in the alertness of the driver.

Patent Document 1: Japanese Laid-Open Patent Publication No. 2014-44707

SUMMARY

In this type of driver assistance system, there is a need to establish communication with a device located outside the vehicle when the alertness of the driver declines. However, if, for example, an antenna or the like is arranged in the vehicle to enable such communication, the number of parts will be increased.

One objective of the present invention is to provide a driver assistance system and a driver assistance method that limit increases in the number of parts.

A driver assistance system that solves the above problem uses a wireless authentication functionality to perform authentication using key information through wireless communication between a portable terminal that obtains the key information required to operate a vehicle through network communication and an authentication device that is arranged in the vehicle. The authentication device actuates the vehicle through an electronic key system of the vehicle when the authentication is accomplished. The system includes a determination unit that receives operation information based on a vehicle operation performed by a driver who is driving the vehicle, performs an abnormality determination that checks whether the vehicle operation is abnormal from the operation information, and performs a predetermined action when the vehicle operation is determined as being abnormal. The determination unit uses the wireless authentication functionality to execute at least part of a series of processes of the abnormality determination and the predetermined action.

A method for assisting a driver that solves the above problem uses a wireless authentication functionality to perform authentication using key information through wireless communication between a portable terminal that obtains the key information required to operate a vehicle through network communication and an authentication device that is arranged in a vehicle. The authentication device actuates the vehicle through an electronic key system of the vehicle when the authentication is accomplished. The method includes steps of performing an abnormality determination when receiving operation information based on a vehicle operation performed by a driver who is driving the vehicle to check whether the vehicle operation is abnormal from the operation information; and performing a predetermined action when the vehicle operation is determined as being abnormal. At least part of a series of processes of the abnormality determination and the predetermined action is executed using the wireless authentication functionality.

The driver assistance system and the driver assistance method are implemented without significantly increasing the number of parts.

DESCRIPTION OF THE EMBODIMENTS

An embodiment of a driver assistance system and a driver assistance method will now be described with reference to FIGS. 1 to 6.

Figure 1:
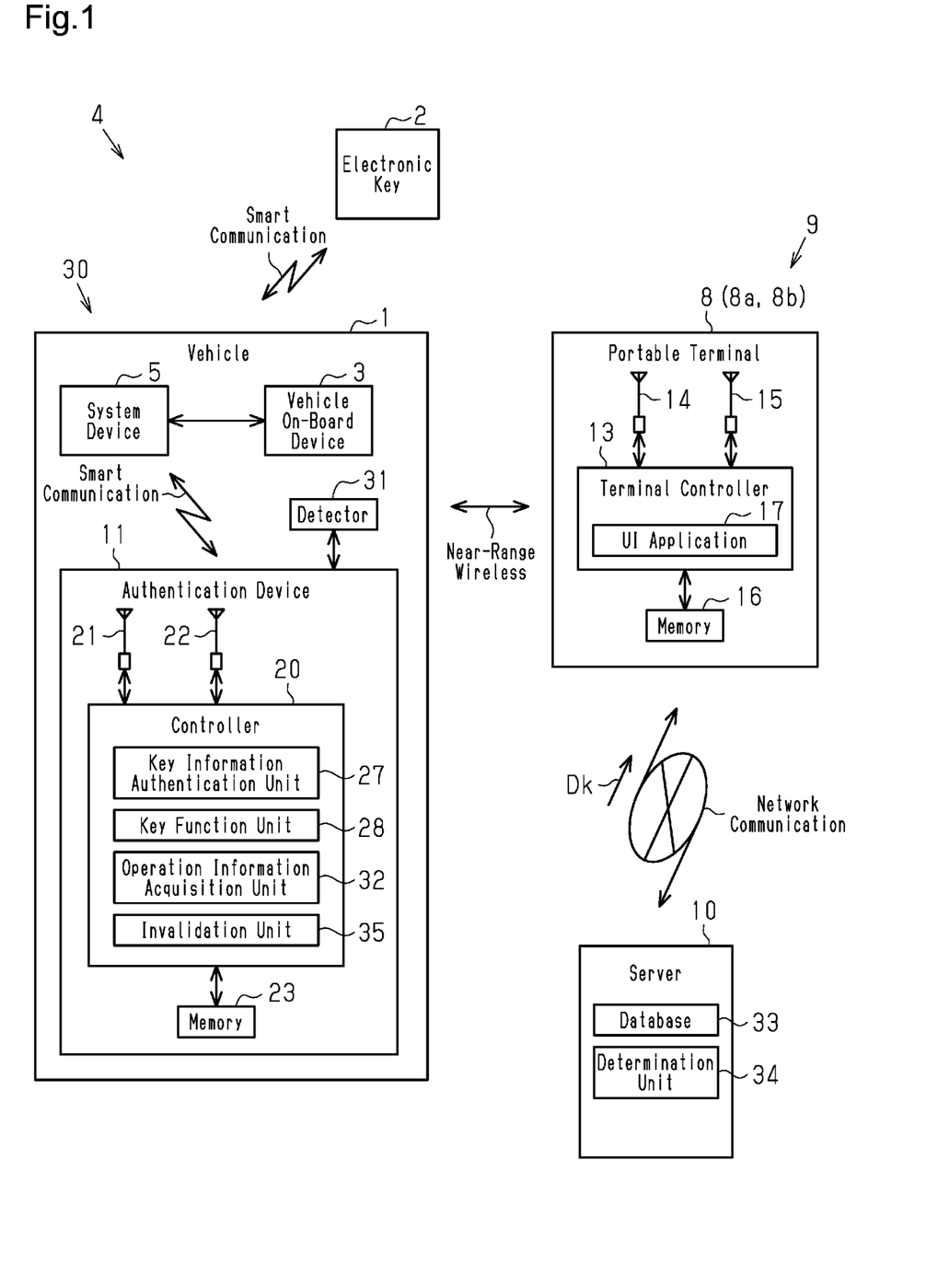
FIG. 1 is a block diagram showing the configuration of a driver assistance system arranged in an authentication system.

As shown in FIG. 1, a vehicle 1 includes an electronic key system 4 that performs ID verification through wireless communication established with an electronic key 2 to actuate or permit actuation of a vehicle on-board device 3. The electronic key system 4 is a key-operation-free system that performs ID verification (smart verification) through near-range wireless communication when communication from the vehicle 1 is established. The vehicle on-board device 3 includes, for example, a door lock device and an engine.

The electronic key system 4 includes a system device 5 that actuates the electronic key system 4 in the vehicle 1. The electronic key 2 and the system device 5 store an electronic key ID and a key-unique code used for smart verification. The electronic key 2 and the system device 5 perform smart verification through bidirectional communication in which radio waves are transferred between the electronic key 2 and the system device 5. The smart verification performs, for example, electronic key ID verification that checks the validity of an electronic key ID and challenge-response authentication that uses the key-unique code. The system device 5 transmits radio waves to the electronic key 2 using radio waves in a low frequency (LF) band, and the electronic key 2 transmits radio waves to the system device 5 using radio waves in an ultra high frequency (UHF) band.

When the system device 5 establishes smart communication (exterior smart communication) with the electronic key 2 located outside the vehicle and accomplishes smart verification (exterior smart verification), the system device 5 locks or unlocks a vehicle door or permits locking and unlocking of the vehicle door. Thus, the vehicle door will be unlocked when an exterior door handle is touched, and the vehicle door will be locked when a lock button on the exterior door handle is operated. Further, when the system device 5 establishes smart communication (interior smart communication) with the electronic key 2 located inside the vehicle and accomplishes smart verification (interior smart verification), switching of the vehicle power state will be permitted. Thus, when an engine switch is pressed while a brake pedal is depressed, the engine will be started.

The vehicle 1 includes a wireless authentication functionality (sharing system 9) that issues key information Dk to a portable terminal 8 carried by each user and allows the vehicle 1 to be operable with the portable terminal 8. The sharing system 9 distributes the key information Dk to the portable terminal 8 of each user of the vehicle 1 so that the same vehicle 1 can be used by a number of users (e.g., family members). The portable terminal 8 is, for example, a high-performance mobile phone (smartphone). In the sharing system 9 of the present example, for example, encrypted key information Dk is obtained from an external device (server 10 in the present example) and registered to the portable terminal 8. Further, the key information Dk is authenticated through communication between the portable terminal 8 and an authentication device 11 that is arranged in the vehicle 1. The authentication result is one condition for determining whether to allow operation of the vehicle 1. Examples of the key information Dk include main-key information Dk1 and sub-key information Dk2. The main-key information Dk1 corresponds to a master key and is issued to a portable terminal 8*a* of the owner (main user) of the vehicle 1. The sub-key information Dk2 is issued to a portable terminal 8*b* of another user to allow the user to temporarily use the vehicle 1. Preferably, the sub-key information Dk2 includes information such as the valid period of the sub-key information Dk2.

The portable terminal 8 includes a terminal controller 13, a network communication module 14, a near-range wireless communication module 15, and a memory 16. The terminal controller 13 controls actuation of the portable terminal 8. The network communication module 14 performs network communication in the portable terminal 8. The near-range wireless communication module 15 performs near-range wireless communication in the portable terminal 8. The memory 16 is data writable and rewritable. When the portable terminal 8 obtains the key information Dk through network communication from the server 10, the key information Dk is written to and stored in the memory 16. Preferably, the near-range wireless communication is, for example, Bluetooth (registered trademark) communication.

The portable terminal 8 includes a user interface application 17 that manages actuation of the sharing system 9 in the portable terminal 8. The user interface application 17 is, for example, downloaded from the server 10 and installed in the terminal controller 13. The user interface application 17 executes various processes such as personal verification when obtaining the key information Dk, the locking and unlocking of the vehicle door, and the starting of the engine of the vehicle 1.

The authentication device 11 includes a controller 20, a smart communication block 21, and a near-range wireless communication module 22. The controller 20 controls actuation of the authentication device 11. The smart communication block 21 performs smart communication in the authentication device 11. The near-range wireless communication module 22 performs near-range wireless communication in the authentication device 11. Further, the authentication device 11 includes a memory 23 that is data-writable and rewritable. An authentication device ID, which corresponds to the vehicle ID (vehicle identification number), is registered to the authentication device 11 to link the authentication device 11 and the vehicle 1 and form a one-to-one relationship with the vehicle 1.

The authentication device 11 includes a key information authentication unit 27 and a key function unit 28. The key information authentication unit 27 authenticates the validity of the key information Dk that is registered to the portable terminal 8. The key function unit 28 acts in the same manner as the electronic key 2 to actuate the authentication device 11. The key information authentication unit 27 and the key function unit 28 are arranged in the controller 20. The key information authentication unit 27 obtains the key information Dk through near-range wireless communication from the portable terminal 8 and authenticates the key information Dk. When the key information Dk is authenticated, the key information authentication unit 27 switches the key function unit 28 to an ON-state (enabled). When the key function unit 28 is switched to an ON-state, smart communication (smart verification) with the electronic key system 4 is allowed.

Procedures for issuing the main-key information Dk1 to the portable terminal 8*a* of the owner of the vehicle 1 and actuating the vehicle 1 in the sharing system 9 will now be described with reference to FIGS. 2 and 3.

Figure 2:
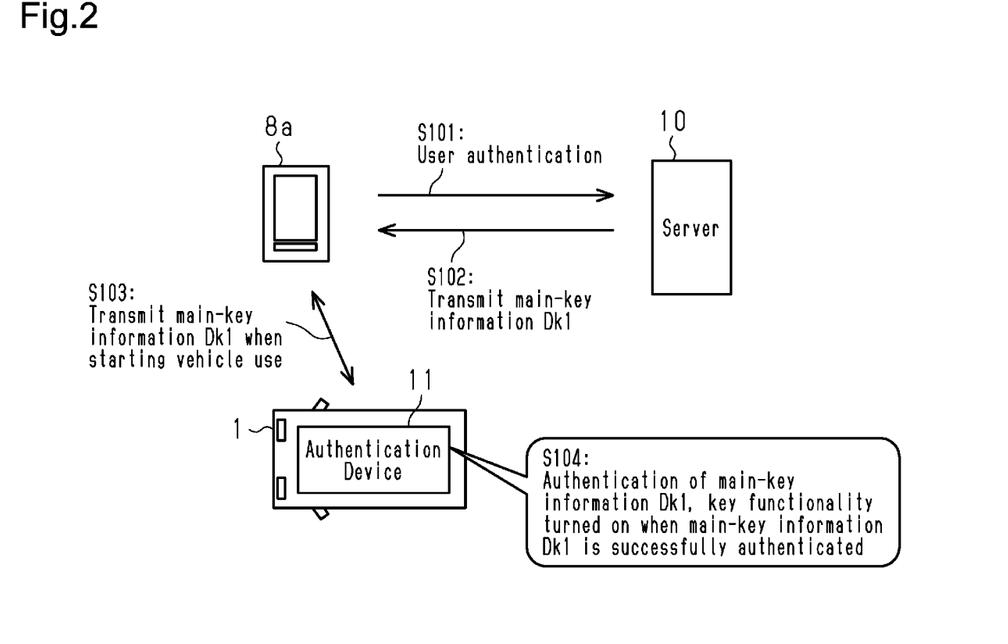
FIG. 2 is a diagram illustrating the procedure of key information authentication.

As shown in FIG. 2, in step S101, to receive the main-key information Dk1 that is distributed from the server 10, the portable terminal 8*a* performs user verification with the server 10 through network communication. The user verification checks, for example, a user ID and password that are assigned to the user when the user is registered to use the sharing system 9.

In step S102, when user verification is accomplished, the server 10 generates the key information Dk (main-key information Dk1) and transmits the key information Dk through network communication to the portable terminal 8*a*. The main-key information Dk1 in the present example includes, for example, cipher texts obtained by encrypting plain texts such as "terminal ID" and "user authentication code" with a predetermined cipher (encryption algorithm) using an encryption code that is unique to the authentication device 11 installed in the reserved vehicle. The terminal ID is an ID unique to the portable terminal 8*a*. The user authentication code is, for example, one type of an encryption code that is used in encrypted communication established between the portable terminal 8*a* and the authentication device 11 when actuating the vehicle with the portable terminal 8*a*. When the portable terminal 8*a* receives the main-key information Dk1 from the server 10, the portable terminal 8 writes and stores the main-key information Dk1 in the memory 16.

In step S103, the portable terminal 8*a* transmits the registered main-key information Dk1 through near-range wireless communication to the authentication device 11. The main-key information Dk1 is transmitted through, for example, Bluetooth Low Energy (BLE) communication.

In step S104, when the authentication device 11 receives the main-key information Dk1, the authentication device 11 authenticates the main-key information Dk1. In the present example, the key information authentication unit 27 decrypts the main-key information Dk1 using, for example, the encryption code unique to the authentication device 11 and checks whether the decryption is successful. In this case, when the main-key information Dk1 is decrypted, the key information authentication unit 27 obtains "terminal ID", "user authentication code", and the like from the main-key information Dk1. When the main-key information Dk1 is authenticated based on the validity of the obtained information, the vehicle 1 becomes operable with the portable terminal 8*a*.

When the main-key information Dk1 is authenticated, the authentication device 11 is shifted to "authentication completed state" of the main-key information Dk1, and the key function unit 28 is turned on. When the key function unit 28 is in an ON-state, the key function unit 28 enables smart communication of the electronic key system 4 and allows smart verification to be performed.

When the key information Dk is authenticated, the authentication device 11 performs near-range wireless communication to notify the portable terminal 8a of the user authentication code obtained through the authentication. When the portable terminal 8a receives the user authentication code from the authentication device 11, the portable terminal 8a registers the user authentication code to the memory 16. In this manner, the user authentication code is registered to both of the portable terminal 8a and the authentication device 11. Accordingly, when the portable terminal 8a actuates the vehicle 1 through the authentication device 11, the user authentication code will be used in encrypted communication established between the portable terminal 8a and the authentication device 11.

Figure 3:
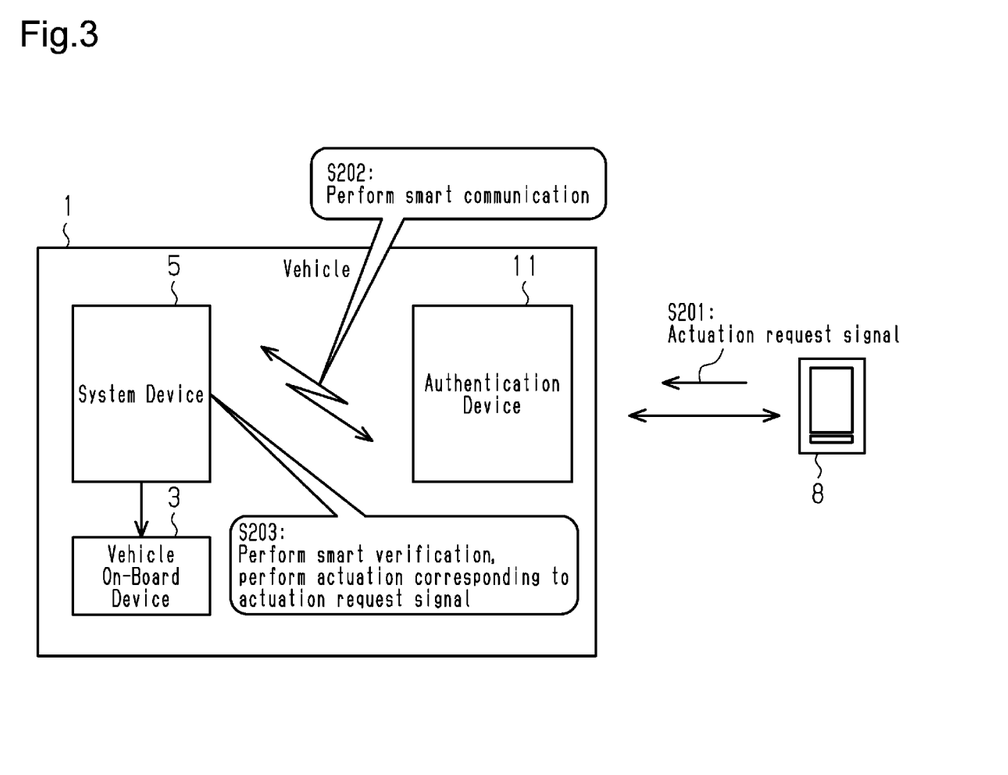
FIG. 3 is a diagram illustrating the procedure for operating a vehicle on-board device with a portable terminal.

FIG. 3 shows a procedure for operating the vehicle 1 with the portable terminal 8. In step S201 of FIG. 3, when an actuation request button (button displayed on screen) on the portable terminal 8 is operated in a state in which the portable terminal 8 is in an authentication completed state, the portable terminal 8 transmits an actuation request signal corresponding to the button through near-range wireless communication to the authentication device 11. Examples of the actuation request button include an unlocking request button that is operated to unlock the vehicle door, a locking request button that is operated to lock the vehicle door, an engine start request button that is operated to permit the vehicle 1 to start the engine, and the like. The actuation request signal is a signal including a command corresponding to the operated actuation request button. The actuation request signal is encrypted with, for example, the user authentication code when transmitted.

In step S202, if the key function unit 28 receives the actuation request signal from the portable terminal 8 when the key function unit 28 is in an ON-state, the key function unit 28 performs smart communication in the electronic key system 4 between the system device 5 and the authentication device 11 to notify the system device 5 of the actuation request signal during the smart communication. In the present example, when the key function unit 28 is turned on, the key function unit 28 performs smart verification using the electronic key ID and the encryption code that are registered to the key function unit 28. When smart verification performed with the system device 5 is successful, the authentication device 11 notifies the system device 5 of the actuation request signal obtained from the portable terminal 8 through the smart communication.

In step S203, when the system device 5 is notified of the actuation request signal by the authentication device 11, the system device 5 executes an actuation corresponding to the actuation request signal under the condition that smart verification performed with the authentication device 11 (key function unit 28) has been accomplished. This permits locking and unlocking of the vehicle door or engine starting. In this manner, the user can actuate the vehicle 1 with the portable terminal 8, which obtained the key information Dk.

A procedure for issuing the sub-key information Dk2 to the portable terminal 8b of a user (family member or the like) other than the owner of the vehicle 1 to actuate the vehicle 1 in the sharing system 9 will now be described with reference to FIG. 4.

Figure 4:
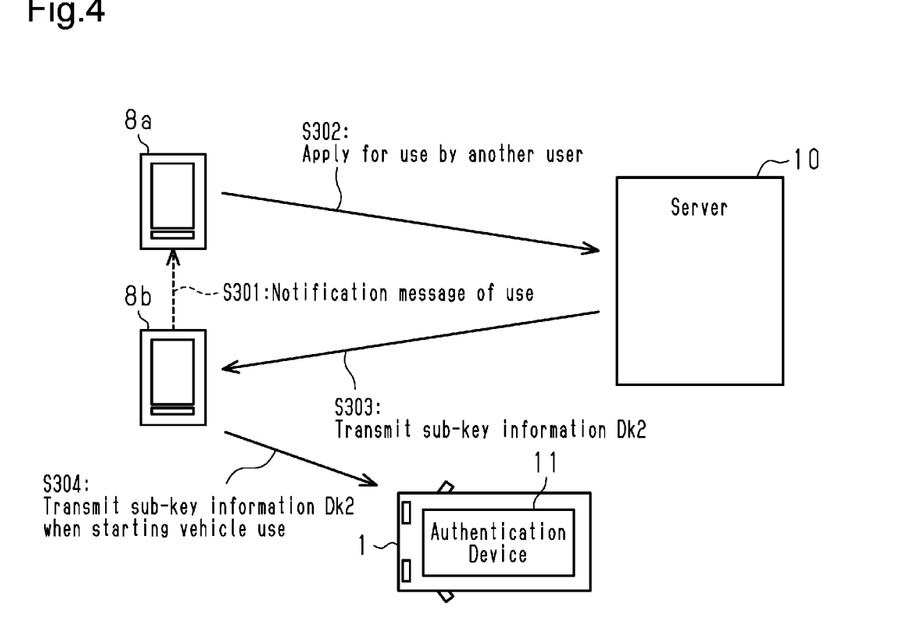
FIG. 4 is a diagram illustrating the procedure for issuing the key information to a portable terminal of another user.

As shown in FIG. 4, in step S301, when another user will use the vehicle 1, the portable terminal 8b sends a message notifying use of the vehicle 1 to the portable terminal 8a of the owner of the vehicle 1. Preferably, for example, the portable terminal 8b notifies the portable terminal 8a of the request to use the vehicle through network communication or near-range wireless communication.

In step S302, the portable terminal 8a sends a request for use of the vehicle by the other user to the server 10. In the present example, the owner performs an operation for granting operation privilege that allows vehicle usage so that the portable terminal 8a notifies the server 10 of the use notification message received from the portable terminal 8b. When the request for use is sent, the server 10 is notified of the user ID of the other user, the reserved date and time of use of the vehicle 1 requested by the other user, and the like.

In step S303, the server 10 generates the key information Dk that is issued to the other user when receiving the request from the portable terminal 8a and transmits the key information Dk through network communication to the portable terminal 8b. In this case, the server 10 generates the sub-key information Dk2 having a value that differs from that of the main-key information Dk1. Further, the user ID in the received request for use allows the other user to be identified. Preferably, the sub-key information Dk2 includes cipher texts generated by, for example, using "date and time for use (reserved date and time)", "terminal ID", "user authentication code (different key from portable terminal 8a)", and "operation authority information" as plain texts, using a predetermined encryption code (e.g., encryption code unique to authentication device 11) as an encryption key, and applying the plain texts and the encryption key to a cipher (encryption algorithm). The operation privilege information indicates devices of the vehicle 1 that can be actuated with the sub-key information Dk2. When the portable terminal 8b receives the sub-key information Dk2 from the server 10, the portable terminal 8b writes and stores the sub-key information Dk2 in the memory 16.

In step S304, when the portable terminal 8b is connected to the vehicle 1 in a manner allowing for communication, the portable terminal 8b transmits the registered sub-key information Dk2 through near-range wireless communication to the authentication device 11. The sub-key information Dk2 is transmitted through, for example, Bluetooth Low Energy (BLE) communication. When the authentication device 11 receives the sub-key information Dk2, the authentication device 11 authenticates the sub-key information Dk2. The authentication of the second key information Dk2 is performed in the same manner as step S104 described above and thus will not be described in detail. When the sub-key information Dk2 is authenticated, the key function unit 28 is turned on and the vehicle can be used with the portable terminal 8b.

As shown in FIG. 1, the vehicle 1 includes a driver assistance system 30 that performs a predetermined action when determining that a vehicle operation performed by the driver of the vehicle 1 is abnormal. Among the users registered to the sharing system 9, the driver referred to in this case is the driver who is presently driving the vehicle 1. The driver assistance system 30 of the present example monitors the vehicle operations performed by the driver to assist the driver and perform a predetermined action when determining that an abnormal vehicle operation has been performed due to the state of the driver differing from normal. Such a case would occur due to, for example, heart attack symptoms, epileptic seizure symptoms, disorders of consciousness, and the like. The predetermined action includes issuance of an abnormality notification to another portable terminal 8 that is registered in advance, restriction of vehicle operation, and the like.

The driver assistance system 30 includes a detector 31 arranged in the vehicle 1 that detects vehicle operations. In an example, the detector 31 includes an acceleration sensor and a gyro sensor. The detector 31 detects changes in the acceleration and angular velocity in the directions of three axes as operation information Da resulting from acceleration, deceleration, or cornering of the vehicle 1. The detector 31 is connected to the authentication device 11 through wired or wireless communication. The detector 31 may detect the operation information Da that includes acceleration, angular velocity, vehicle speed, accelerator pedal stroke, brake pedal stroke, steering angle, operation of switches in the vehicle 1, or a combination of these parameters. The switches include a power window switch, a column switch, a mirror switch, a door lock switch, an engine switch, and the like. Further, the operation information Da may be transmitted from the system device 5 through wired communication or smart communication to the authentication device 11.

The authentication device 11 includes an operation information acquisition unit 32 that acquires the operation information Da detected by the detector 31. When the operation information acquisition unit 32 acquires the operation information Da, the operation information acquisition unit 32 transmits the operation information Da via the portable terminal 8 to the server 10 to accumulate the operation information Da in a database 33 arranged in the server 10. The operation information Da is linked to identification information (for example, identification information of driver of vehicle 1) and accumulated in the database 33 so that the user associated with the operation information Da can be identified. An example of the identification information is the user ID.

The driver assistance system 30 includes a determination unit 34 that determines whether a vehicle operation performed by the driver of the vehicle 1 is abnormal. The determination unit 34 executes an abnormality determination process and a predetermined action process. In the abnormality determination process, the determination unit 34 determines from the input operation information Da whether a vehicle operation is abnormal. In a predetermined action process, the determination unit 34 performs a predetermined action when the vehicle operation is determined as being abnormal. The determination unit 34 of the present example is arranged in the server 10. In an abnormality determination process, when the determination unit 34 receives the operation information Da from the operation information acquisition unit 32, the determination unit 34 performs a determination by comparing the operation information Da with the operation information Da accumulated in the database 33. Further, in a predetermined action process, for example, the determination unit 34 issues an abnormality notification to the portable terminal 8.

The authentication device 11 includes an invalidation unit 35 that invalidates the key information Dk when a vehicle operation is determined as being abnormal. When a vehicle operation is determined as being abnormal, the invalidation unit 35 of the present example invalidates the key information Dk that was issued to the portable terminal 8 of the driver and authenticated with the authentication device 11 and the portable terminal 8. Thus, authentication cannot be accomplished with the portable terminal 8 and the authentication device 11, and the key function unit 28 is turned off. Further, the vehicle 1 can no longer be actuated with the same key information Dk.

The operation and advantages of the driver assistance system 30 will now be described with reference to FIGS. 5 and 6. A case where a user other than the owner of the vehicle 1 actuates the vehicle 1 with the portable terminal 8b that obtained the sub-key information Dk2 with the sharing system 9 will now be described.

Figure 5:
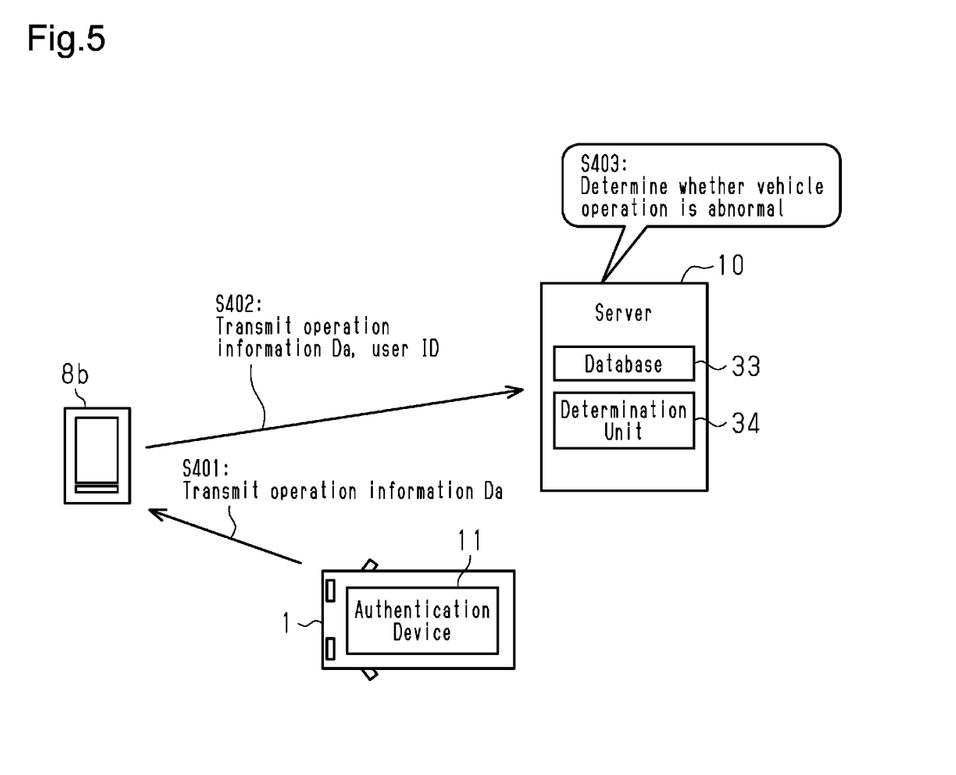
FIG. 5 is a diagram illustrating the procedure of an abnormality determination process.

As shown in FIG. 5, in step S401, the operation information acquisition unit 32 obtains the operation information Da from the detector 31, and the operation information acquisition unit 32 transmits the operation information Da through near-range wireless communication to the portable terminal 8b. The operation information acquisition unit 32 repetitively transmits the operation information Da in a periodic or non-periodic manner when the vehicle 1 is being driven.

In step S402, the portable terminal 8b receives the operation information Da from the operation information acquisition unit 32 and transmits the operation information Da through network communication to the server 10. In this case, the operation information Da is transmitted together with the identification information of the other user registered to the sharing system 9. In the present example, the operation information Da is transmitted together with the user ID. In the portable terminal 8b, the user interface application 17 controls actuation of the driver assistance system 30.

In step S403, the determination unit 34 determines whether the vehicle operation is abnormal from the received operation information Da and the user ID. The determination unit 34 compares the received operation information Da with the accumulated operation information Da of the same user. For example, when the difference between a characteristic amount calculated from the presently received operation information Da and a characteristic amount calculated from the past operation information Da of the same user is excluded from a predetermined range, the determination unit 34 determines that the vehicle operation is abnormal. When the difference of the characteristic amounts is included in the predetermined range, the determination unit 34 determines that a vehicle operation is normal. In this manner, the database 33 located outside the vehicle 1 can be used in the abnormality determination process executed by the determination unit 34 through communication with the sharing system 9.

The received operation information Da is linked to the user ID and accumulated in the database 33 only when the vehicle operation is determined as being normal. When the vehicle operation is determined as being abnormal, the received operation information Da will not be accumulated. Further, it is preferred that the characteristic amount be calculated based on comparisons with all of the operation information Da in the database 33 including the operation information Da linked to other user IDs. This allows vehicle operation characteristics to be accurately obtained for each user.

A procedure of the predetermined action process when a vehicle operation is determined as being abnormal will now be described.

Figure 6:
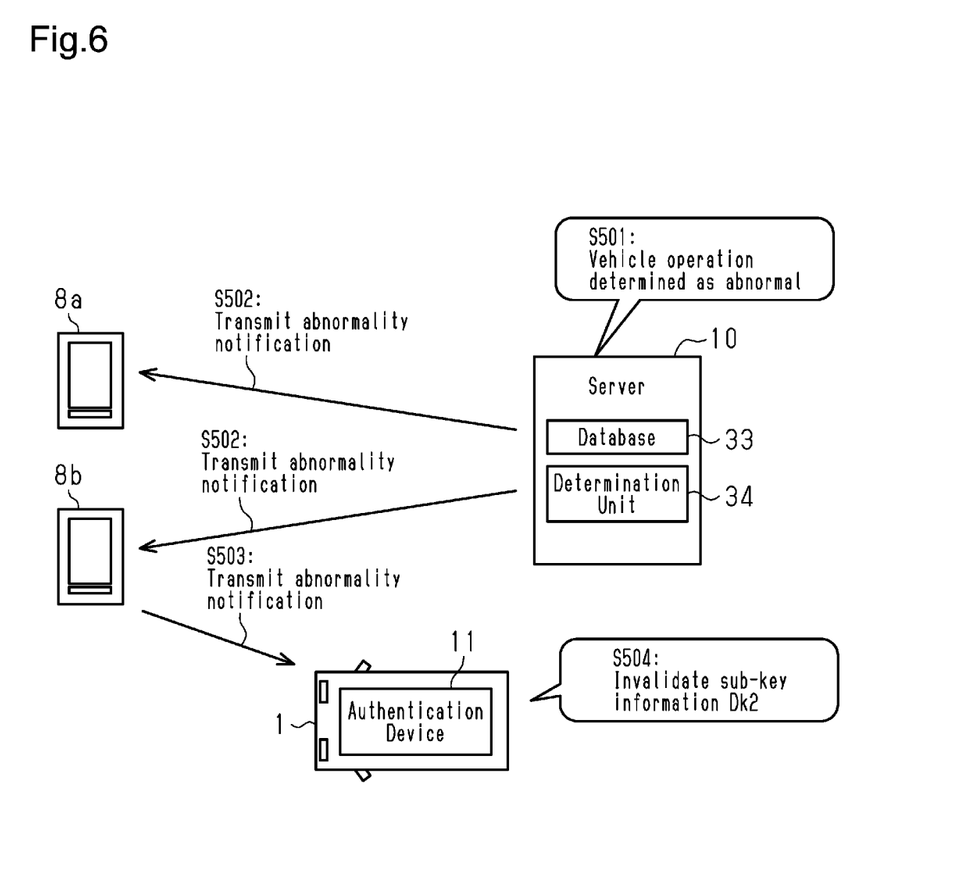
FIG. 6 is a diagram illustrating the procedure of a predetermined action process.

As shown in FIG. 6, in step S501, when the determination unit 34 performs an abnormality determination process (FIG. 5) based on the received operation information Da and determines that the vehicle operation is abnormal, the determination unit 34 performs a predetermined action process.

In step S502, the server 10 transmits an abnormality notification to the portable terminal 8 that is registered in advance. In the present example, an abnormality notification is transmitted to the portable terminal 8b of the driver and the portable terminal 8a carried by the owner (main user) of the vehicle 1. That is, when a vehicle operation is determined as being abnormal, an abnormality notification is transmitted to the portable terminal 8b, which is being used presently in the vehicle 1 and belongs to the driver who has been determined as having performed an abnormal vehicle operation, and the portable terminal 8a, which is not being used presently in the vehicle 1. The user driving the vehicle may lack driving reliability. In such a case, the transmission of an abnormality notification to the portable terminal 8a allows the owner of the vehicle 1 to be notified of an abnormal state of the user (driver).

In step S503, the portable terminal 8b receives the abnormality notification from the server 10 and transfers the abnormality notification to the authentication device 11, which is connected to the portable terminal 8b in a manner allowing for communication.

In step S504, the invalidation unit 35 receives the abnormality notification from the portable terminal 8b and shifts the key function unit 28 to an OFF-state. Further, the invalidation unit 35 invalidates the sub-key information Dk2 issued to the driver. When the key function unit 28 is in an OFF-state, smart communication cannot be performed. Thus, the vehicle 1 cannot be actuated with the portable terminal 8. Further, authentication cannot be accomplished between the portable terminal 8b and the authentication device 11 because the sub-key information Dk2 has been invalidated. This prohibits, for example, re-starting of the engine of the vehicle 1. In this case, only the sub-key information Dk2 that is issued to the portable terminal 8b is invalidated, and the vehicle 1 can still be actuated using the portable terminal 8 of a user other than the driver. This improves convenience as compared with when actuation of the vehicle 1 is restricted.

In the present example, the sharing system 9 includes the determination unit 34 that performs an abnormality determination, which checks whether a vehicle operation performed by the driver of the vehicle 1 is abnormal, and a predetermined action when the vehicle operation is determined as being abnormal. The determination unit 34 is configured to execute at least part of the series of processes of the abnormality determination and a predetermined action using the sharing system 9. Thus, the communication functionality of the sharing system 9 can be used for communication with the outside of the vehicle 1. Thus, the driver assistance system 30 that is installed in the vehicle 1 together with the sharing system 9 does not increase the number of parts in the entire vehicle 1 used for communication.

In the present example, the determination unit 34 is configured to perform a predetermined action via the server 10, which is connected to the portable terminal 8 through network communication, when a vehicle operation is determined as being abnormal. Thus, the network communication can be used to send a notification to the outside of the vehicle 1 of the abnormality and improves safety.

In the present example, when a vehicle operation is determined as being abnormal, the determination unit 34 is configured to issue an abnormality notification to the portable terminal 8, which is not being used presently in the vehicle 1, as the predetermined action. This allows the abnormal state of a user (driver) who is driving the vehicle 1 and lacks driving reliability to be notified to another user and thereby improves safety.

In the present example, when a vehicle operation is determined as being abnormal, the determination unit 34 is configured to invalidate the key information Dk obtained by the portable terminal 8 of the driver. This restricts vehicle operations performed by a driver who cannot perform normal vehicle operations and thereby improves safety.

In the present example, the operation information Da accumulated in the database 33 is linked to the user ID, which is assigned when the portable terminal 8 obtains the key information Dk. Further, the determination unit 34 is configured to perform determinations based on the operation information Da, which is linked to the user ID of the driver. With this configuration, determinations are performed based on the operation information Da of the driver so that the characteristics of vehicle operations performed by the same driver can be taken into consideration. This improves the accuracy of vehicle operation abnormality determination.

The present embodiment may be modified as follows. The present embodiment and the following modifications can be combined as long as the combined modifications remain technically consistent with each other.

The predetermined action, which is performed when a vehicle operation is determined as being abnormal, may be the transmission of an abnormality notification, the invalidation of the key information Dk, restriction of key information issuance, an emergency action of the vehicle, or a combination of these actions. Examples of an emergency action of the vehicle include issuance of a vocal or visual warning, decreasing or stopping the engine output, guiding the vehicle 1 to a safe location using a navigation system, and moving the vehicle 1 to a safe location through autonomous driving.

The key information Dk may be invalidated in any manner as long as the vehicle 1 cannot be operated using the key information Dk that is registered to the portable terminal 8 that is being used presently in the vehicle 1 when a vehicle operation is determined as being abnormal. The key information Dk registered to the portable terminal 8 may be deleted, authentication with the key information Dk in use may be prohibited, or smart communication may be prohibited.

The invalidation unit 35 may, but does not have to be arranged in the server 10, the authentication device 11, or the portable terminal 8.

An abnormality notification may be transmitted to, for example, registered family members or a person managing the vehicle. The transmission destination is not limited to the description of the embodiment.

The vehicle 1 may include a functionality for prohibiting starting of the engine of the vehicle 1 through a remote operation performed with the portable terminal 8a of the owner of the vehicle or a remote operation performed at a center or the like that can communicate with the vehicle 1.

In the sharing system 9, the user ID registered for another user may be input by any one of the portable terminal 8a or the portable terminal 8b or be assigned by the server 10.

The identification information is not limited to the user ID and may be any information that can identify the driver of the vehicle 1. For example, the identification information may be the terminal ID of the portable terminal 8.

The determination unit 34 does not have to perform abnormality determination based on the identification information and may perform abnormality determination by comparing, for example, every piece of operation information Da accumulated in the database 33. When determinations are performed based on the operation information Da linked to the identification information, the determinations will be less affected by characteristics such as driving tendencies or driving habits of each driver.

The operation information Da may be linked to information other than the identification information. For example, the operation information Da may be linked to positional information or time, such as the coordinates of the vehicle 1, for accumulation.

The operation information Da may be acceleration, angular velocity, vehicle speed, accelerator pedal stroke, brake pedal stroke, steering angle, operation history of the switches of the vehicle 1, or a combination of these parameters. The switches include, a power window switch, a column switch, a mirror switch, a door lock switch, an engine switch, and the like.

The determination unit 34 may perform abnormality determination by comparing the operation information Da of the driver driving the vehicle 1 with the operation information Da of another driver who is presently driving a different vehicle. For example, when the operation information Da is operation history of a wiper operated by a column switch, an abnormality determination may be given when the wiper is kept in an OFF-state even though other drivers in the same region have turned on their wipers.

The wireless authentication functionality need only be used in at least part of the abnormality determination process and the predetermined action process, and the wireless authentication functionality does not have to be used in one of the abnormality determination process and the predetermined action process.

The operation information acquisition unit 32 may be arranged in the authentication device 11, the portable terminal 8, or the server 10. Further, the operation information acquisition unit 32 may obtain the operation information Da by accessing the detector 31 or the system device 5.

The determination unit 34 may be arranged in the server 10, the authentication device 11, or the portable terminal 8. For example, when the determination unit 34 is arranged in the authentication device 11, the abnormality determination process may entirely be performed in the vehicle 1, and the predetermined action process may solely be performed through communication between the authentication device 11, the portable terminal 8, and the server 10.

The database 33 may be arranged in the server 10, the authentication device 11, or the portable terminal 8.

The database 33 does not have to be included and determinations of vehicle operations may be performed through calculations with the operation information Da using a preset determination equation.

The detector 31 may be pre-installed in the vehicle 1 or may be added to the vehicle 1.

The sharing system 9 may issue the key information Dk through any procedure and is not limited to the procedure described in the embodiment. For example, the other user may directly access the server 10 through the portable terminal 8b and obtain the key information Dk.

The authentication device 11 may be installed anywhere.

The authentication device 11 may be pre-installed in the vehicle 1 or may be added to the vehicle 1.

The authentication device 11 may be integrated with the system device 5 as a single unit.

The authentication device 11 and the system device 5 may perform LF-UHF bidirectional communication. Further, the system device 5 may perform ID verification and actuation of the vehicle 1 when radio waves including commands of actuating the authentication device 11 and the vehicle 1 are transmitted from the authentication device 11. The configurations described above may be combined.

The authentication device 11 and the system device 5 may perform wireless or wired communication.

The near-range wireless communication is not limited to Bluetooth communication and may be changed to other communication protocols.

Various frequencies and communication protocols can be applied to communication established between the portable terminal 8 and the authentication device 11, communication established between the system device 5 and the authentication device 11, communication established between the electronic key 2 and the system device 5, communication established between the portable terminal 8 and the server 10, and communication established between the server 10 and the authentication device 11.

The key information Dk does not have to be differentiated between the main-key information Dk1 and the sub-key information Dk2. Further, the key information Dk may be a one-time code, a temporary code, or a permanent code.

The key information Dk may include information that is different from that of the embodiment.

The key information Dk does not have to be generated in the server 10 and may be generated in any external device located outside the vehicle 1.

The key function unit 28 may be switched to an ON-state under any condition.

The portable terminal 8 is not limited to a high-performance mobile phone and may be changed to various types of terminals.

The electronic key system 4 is not limited to a key-operation-free system and may be changed to other system configurations.

The vehicle 1 does not have to be owned by an individual and may be a shared car that is shared by a number of persons.

The invention claimed is:

1. A driver assistance system that uses a wireless authentication functionality to perform authentication using key information through wireless communication between a portable terminal that obtains the key information required to operate a vehicle through network communication and an authentication device that is arranged in the vehicle, wherein the authentication device actuates the vehicle through an electronic key system of the vehicle when the authentication is accomplished, the driver assistance system comprising:

a determination unit that receives operation information based on a vehicle operation performed by a driver who is driving the vehicle, performs an abnormality determination that checks whether the vehicle operation is abnormal from the operation information, and performs a predetermined action when the vehicle operation is determined as being abnormal, wherein the determination unit uses the wireless authentication functionality to execute at least part of a series of processes of the abnormality determination and the predetermined action, wherein the portable terminal is one of a plurality of portable terminals including a first portable terminal and a second portable terminal, wherein the wireless authentication functionality is a sharing system that allows the vehicle to be sharable among the plurality of portable terminals, wherein the electronic key system includes a system device that allows operation of the vehicle, through bidirectional wireless communication with the authentication device, with the portable terminal of which the key information has been authenticated, wherein the authentication device includes:

a key function unit that is turned on when the key information is authenticated and enables the bidirectional wireless communication between the system device and the authentication device; and an invalidation unit that invalidates the key information when the determination unit determines that the vehicle operation is abnormal, wherein the first portable terminal has first key information and the second portable terminal has second key information, and wherein when the first portable terminal is used presently in the vehicle and owned by a driver who performed the vehicle operation determined as being abnormal and the second portable terminal is not being used presently in the vehicle, the invalidation unit shifts the key function unit to an off-state and invalidates, as the predetermined action, the first key information of the first portable terminal.

2. The driver assistance system according to claim 1, wherein when the vehicle operation is determined as being abnormal, the determination unit performs the predetermined action via a server that is connected with the portable terminal through network communication.

3. The driver assistance system according to claim 1, wherein the operation information is linked to identification information, which identifies the driver, when the portable terminal obtains the key information, and accumulated, and the determination unit determines whether the vehicle operation is abnormal based on the operation information linked to the identification information of the driver who is driving the vehicle of the accumulated operation information.

4. The driver assistance system according to claim 1, wherein when the vehicle operation is determined as being abnormal, the determination unit issues an abnormality notification, as the predetermined action, to both of the first portable terminal and the second portable terminal.

5. A driver assistance method that uses a wireless authentication functionality to perform authentication using key information through wireless communication between a portable terminal that obtains the key information required to operate a vehicle through network communication and an authentication device that is arranged in a vehicle, wherein the authentication device actuates the vehicle through an electronic key system of the vehicle when the authentication is accomplished, the method comprising:

performing an abnormality determination when receiving operation information based on a vehicle operation performed by a driver who is driving the vehicle to check whether the vehicle operation is abnormal from the operation information; and performing a predetermined action when the vehicle operation is determined as being abnormal, wherein at least part of a series of processes of the abnormality determination and the predetermined action is executed using the wireless authentication functionality, wherein the portable terminal is one of a plurality of portable terminals including a first portable terminal and a second portable terminal, wherein the wireless authentication functionality is a sharing system that allows the vehicle to be sharable among the plurality of portable terminals, wherein the electronic key system includes a system device that allows operation of the vehicle, through bidirectional wireless communication with the authentication device, with the portable terminal of which the key information has been authenticated, wherein the bidirectional wireless communication between the system device and the authentication device is enabled when the key information is authenticated, wherein the first portable terminal has first key information and the second portable terminal has second key information, and wherein the performing a predetermined action includes when the first portable terminal is used presently in the vehicle and owned by a driver who performed the vehicle operation determined as being abnormal and the second portable terminal is not being used presently in the vehicle, disabling the bidirectional wireless communication between the system device and the authentication device and invalidating, as the predetermined action, the first key information of the first portable terminal.

* * * * *